(12) United States Patent
Baumann et al.

(10) Patent No.: US 7,626,292 B2
(45) Date of Patent: Dec. 1, 2009

(54) CAST GROOVE ELECTRIC MOTOR/GENERATOR COOLING MECHANISM

(75) Inventors: Jonathan M. Baumann, Peoria, IL (US); David M. Fee, Groveland, IL (US)

(73) Assignee: Caterpillar Inc., Peoria, IL (US)

( * ) Notice: Subject to any disclaimer, the term of this patent is extended or adjusted under 35 U.S.C. 154(b) by 315 days.

(21) Appl. No.: 11/825,038

(22) Filed: Jul. 3, 2007

(65) Prior Publication Data
US 2009/0009013 A1 Jan. 8, 2009

(51) Int. Cl.
*H02K 5/06* (2006.01)
*H02K 5/20* (2006.01)
*F28D 7/02* (2006.01)

(52) U.S. Cl. .............................. 310/54; 310/64; 310/89; 165/156

(58) Field of Classification Search .................. 310/54, 310/64, 89; 165/156
See application file for complete search history.

(56) References Cited

U.S. PATENT DOCUMENTS

| | | | | |
|---|---|---|---|---|
| 1,710,648 A | * | 4/1929 | Thompson | 165/156 |
| 1,911,042 A | * | 5/1933 | Steenstrup | 62/391 |
| 3,430,085 A | * | 2/1969 | Mains | 310/54 |
| 3,577,024 A | * | 5/1971 | Inagaki et al. | 310/54 |
| 4,516,044 A | * | 5/1985 | Bone | 310/64 |
| 4,854,373 A | * | 8/1989 | Williams | 165/46 |
| 5,022,851 A | * | 6/1991 | Reiser et al. | 431/215 |
| 5,220,233 A | * | 6/1993 | Birch et al. | 310/156.28 |
| 5,859,482 A | * | 1/1999 | Crowell et al. | 310/58 |
| 5,939,808 A | * | 8/1999 | Adames | 310/89 |
| 6,633,097 B2 | * | 10/2003 | Dunlap et al. | 310/54 |
| 7,322,103 B2 | | 1/2008 | Burjes et al. | |

FOREIGN PATENT DOCUMENTS

| | | | |
|---|---|---|---|
| JP | 3-150048 | * | 6/1991 |
| JP | 6-62547 | * | 3/1994 |

* cited by examiner

*Primary Examiner*—Burton Mullins
(74) *Attorney, Agent, or Firm*—Jandá M. Carter

(57) ABSTRACT

An electric motor/generator cooling mechanism is presented. The cooling mechanism includes a hollow cooling jacket having an inner and outer coaxial surface, where the inner surface defines a generally cylindric cavity for receiving a stator in heat transference contact with the inner surface, and the outer surface has a cast spiral groove section with jogged cooling passages. The disclosure includes an outer case having one or more inlet ports, an outlet port, and a vent for purging air, cooling fluid flowingly encased between the cooling jacket and the outer case, flowing through the jogged cooling passages, and a flanged end surface on an end of the outer case for boltingly connecting the cooling jacket to the outer case.

5 Claims, 3 Drawing Sheets

CAST GROOVE ELECTRIC MOTOR/GENERATOR COOLING MECHANISM

TECHNICAL FIELD

The present disclosure generally relates to a cooling jacket for an electrical machine, and more specifically to a cooling jacket with continuous jogged spiral grooves.

BACKGROUND

Cooling jackets provide an excellent means for cooling electric motors and generators, such as brushless permanent magnet motors operating at high speeds and driven by fuel-powered engines to generate electrical power. Electric motors and generators generate considerable heat and require an efficient cooling system. Motors and generators are often equipped with a means for cooling formed of a cooling jacket provided with grooves or passages built into the motor/generator housing. Circulating oil or water, or even air through the grooves or passages provides cooling to the motors and generators.

It is common practice in machining applications to machine spiral grooves into a metal part. Machined spiral grooves into a housing have been shown to work well to remove the necessary heat from these components, however machined spiral grooves are expensive to cut in a production environment. Further, casting a continuous spiral groove is not simple to achieve nor desirable due to the negative relief caused by the pitch of the spiral, unless parted on several planes, which is a major disadvantage. The several parted planes force the use of multiple parting lines which means more complicated casting procedures and much higher manufacturing costs.

In a patent application to Burjes et al. (2007/0268464 A1), a method of making a motor/generator cooling jacket is disclosed. A hollow cylindrical housing is cast with an outer peripheral surface and an annular axially facing end surface, a plurality of grooves formed in the outer peripheral surface and a radial lip at one end. The Burjes et al. patent application also teaches inlet and outlet ports drilled through the end surface to communicate with the grooves, and sealing recesses and o-ring seals integrated for sealing. However, the prior art process does not provide a simple yet effective and efficient method of manufacture.

Specifically, the Burjes et al. application may require separate cores for the cooling jacket in the housing. Separate cores would increase the casting and other manufacturing costs. Further, the Burjes invention teaches a non-continuous flow path, which may require the cooling fluid to make 180-degree turns and flow in opposite directions. This non-continuous circulation path may lead to inconsistent and inefficient means for equally cooling the stator, and may lead to a less efficient system potentially causing a higher than desired pressure drop across the entire path of the fluid.

The present disclosure is directed to overcoming one or more of the problems set forth above.

SUMMARY

The present disclosure, in one form, provides an electric motor/generator cooling mechanism including a hollow cooling jacket having an inner and outer coaxial surface, where the inner surface defines a generally cylindric cavity for receiving a stator in heat transference contact with the inner surface, and the outer surface has a cast spiral groove section with jogged cooling passages. The disclosure includes an outer case having one or more inlet ports, an outlet port, and a vent for purging air, cooling fluid flowingly encased between the cooling jacket and the outer case, flowing through the jogged cooling passages, and a flanged end surface on an end of the outer case for boltingly connecting the cooling jacket to the outer case.

Other novel features of the present disclosure will be in part apparent and in part pointed out hereinafter.

DETAILED DESCRIPTION

The present disclosure provides an apparatus for cooling an electric drive motor or generator that overcomes the limitations of the prior art. In the detailed description that follows, like numerals are used to denote like elements appearing in one or more of the figures.

Figure 1:
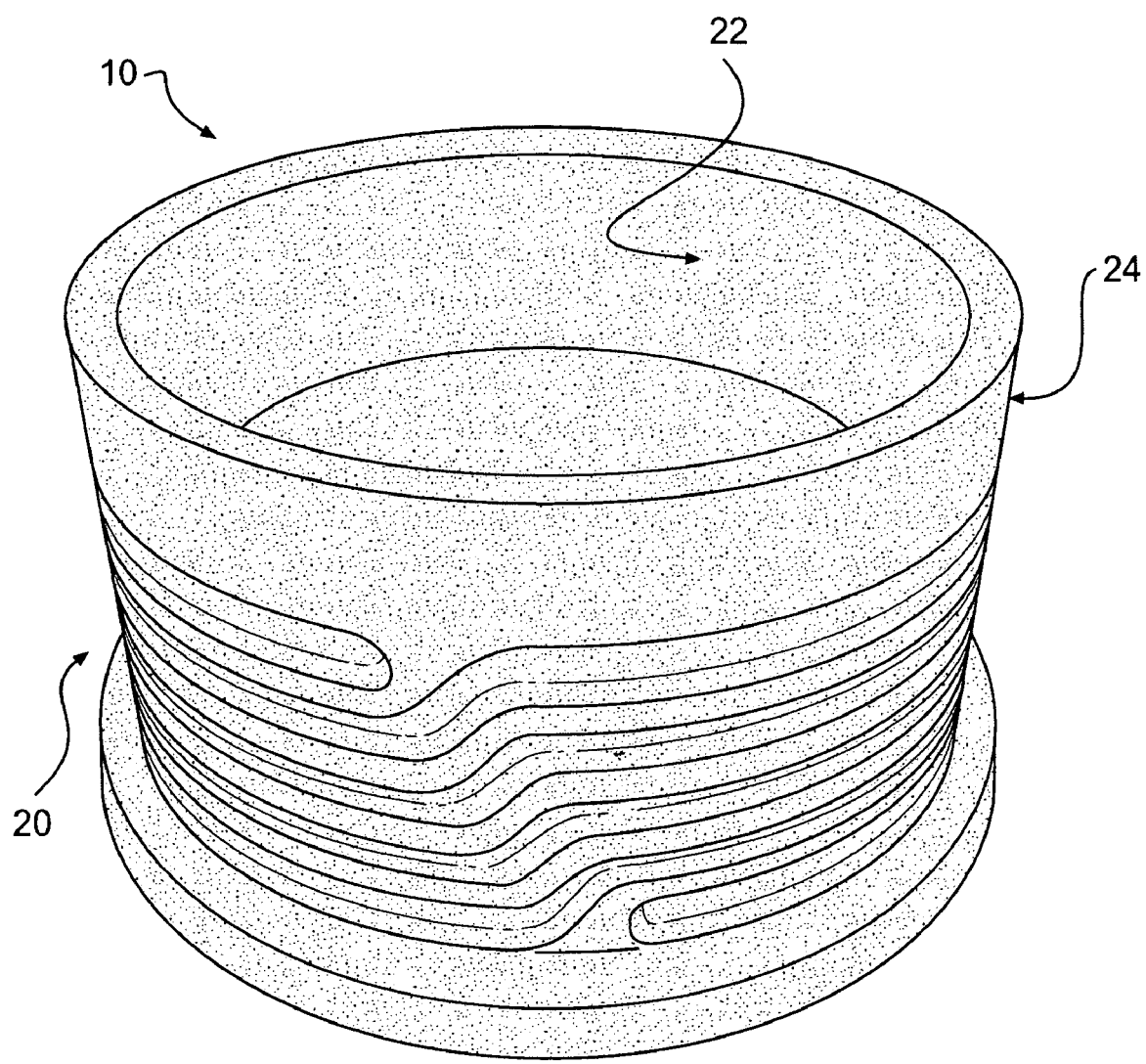
FIG. 1 is a prospective view of an exemplary embodiment of a cast groove cooling jacket of the present disclosure.

FIG. 1 is an illustrative view of an embodiment of the present disclosure. The electric motor/generator cooling mechanism 10 is comprised of a hollow cooling jacket 20, an outer case 30, cooling fluid, sealing o-rings, the case 30 having one or more inlet ports 32, an outlet port 34, and a vent for purging air 36. (The last four numbered elements are not shown in this view, but rather in FIG. 3, and will be discussed in detail later).

The cooling jacket 20 of the present disclosure has inner 22 and outer coaxial surfaces 24. The inner surface 22 defines a generally cylindric cavity for receiving a stator, for example. FIG. 1 depicts the jacket 20 as a circular cylinder, although it should be appreciated that multiple geometries of jacket housings are contemplated within the scope of the present disclosure.

The cooling jacket 20 of the present disclosure is fabricated through a casting process. Within the context of this disclosure, cast should be understood to mean any manufacturing process by which a molten material such as metal or plastic is introduced into a mold, allowed to solidify within the mold, and then ejected or broken out to make a fabricated part. Casting is used for making parts of complex shape that would be difficult or uneconomical to make by other methods, such as cutting from solid material. Types of casting known in the art include sand casting, die casting, permanent mold casting, centrifugal casting, continuous casting, and the like.

Figure 2:
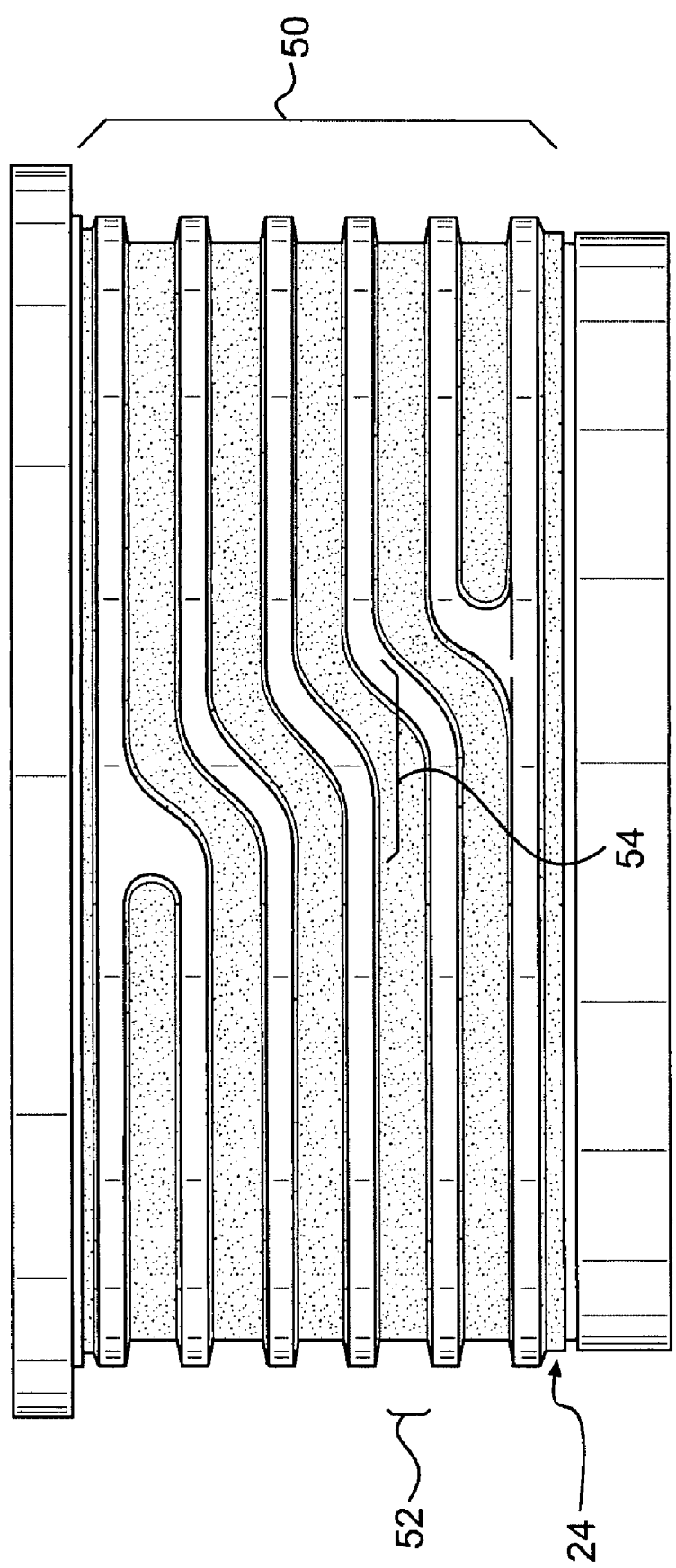
FIG. 2 is a side view of an exemplary embodiment of a cast groove cooling jacket of the present disclosure.

Turning now to FIG. 2, the cooling jacket 20 of the present disclosure consists of a cast spiral groove section 50 on the outer surface 24 that circulates fluid thru the channel (not shown) that is created/contained by the outer case. The cooling jacket spiral groove section 50 further consists of a number of cooling passages or channels 52 that "jog" or "step" over (as shown in area indicated at 54) to allow for as many jogged cooling passages 52 as will fit into the design and size of the part.

The cast spiral groove section 50 is much more cost effective than a machined spiral groove section. The entire cooling groove section 50 is designed to optimize the cooling performance of the coolant. In other words, the individual jogged cooling passage 52 area and length can be designed to allow the coolant to extract the ideal amount of heat from the hot stator. A longer cooling groove path, will allow the coolant more time in contact with the cooling jacket. A shorter path shorter means the coolant will spend less time against the cooling jacket. Similarly, you can adjust the coolant fluid velocity by adjusting the area of the cast jogged cooling passage 52. These features allow correctly designed fluid dynamics for the particular cooling system.

Further, the cooling path 50 of the present disclosure circulates the fluid in a continuous direction and does not require the fluid to make any 180 degree turns (i.e., the fluid is not required to reverse travel flow direction and go back toward an opposite direction), which may keep pressure drop to a minimum. This continuous circulation of cooling fluid may further help to provide a consistent and efficient means of equally cooling the stator (as no interruptions to the cooling path 50 means equal cooling all around).

The cast jogged cooling passages 52 not only allow the fluid to circulate without interruptions, but also help in reducing costs. It is very expensive to machine a cooling jacket 20 with groove sections (even without the spiral grooves 50), and the time to machine is extremely long. Casting the grooves into the part eliminates the large amount of machining and associated time required, and still provides the advantageous continuous path. As discussed above, it is not possible to cast a desirable spiral groove with a single parting line, due to the negative relief issue. As is known, the mold is not separable from the part without multiple parting lines at each associated groove angle. However, the straight grooves of the current disclosure allow the jacket 20 to be cast, and the jogs 54 in the spiral groove section 50 of the jacket allow the formation of the continuous path and to maintain a single parting plane.

The cast jogged cooling passages 52 allow a 'shift' in the cooling path down the length of the jacket while simultaneously maintaining a continuous, uninterrupted path. Additionally, along with the abrasive cast surface, the cast jogs 54 help to create turbulence, which may increase cooling performance. Following casting, the cooling jacket outer surface may be machined into a smooth uniform diameter.

Figure 3:
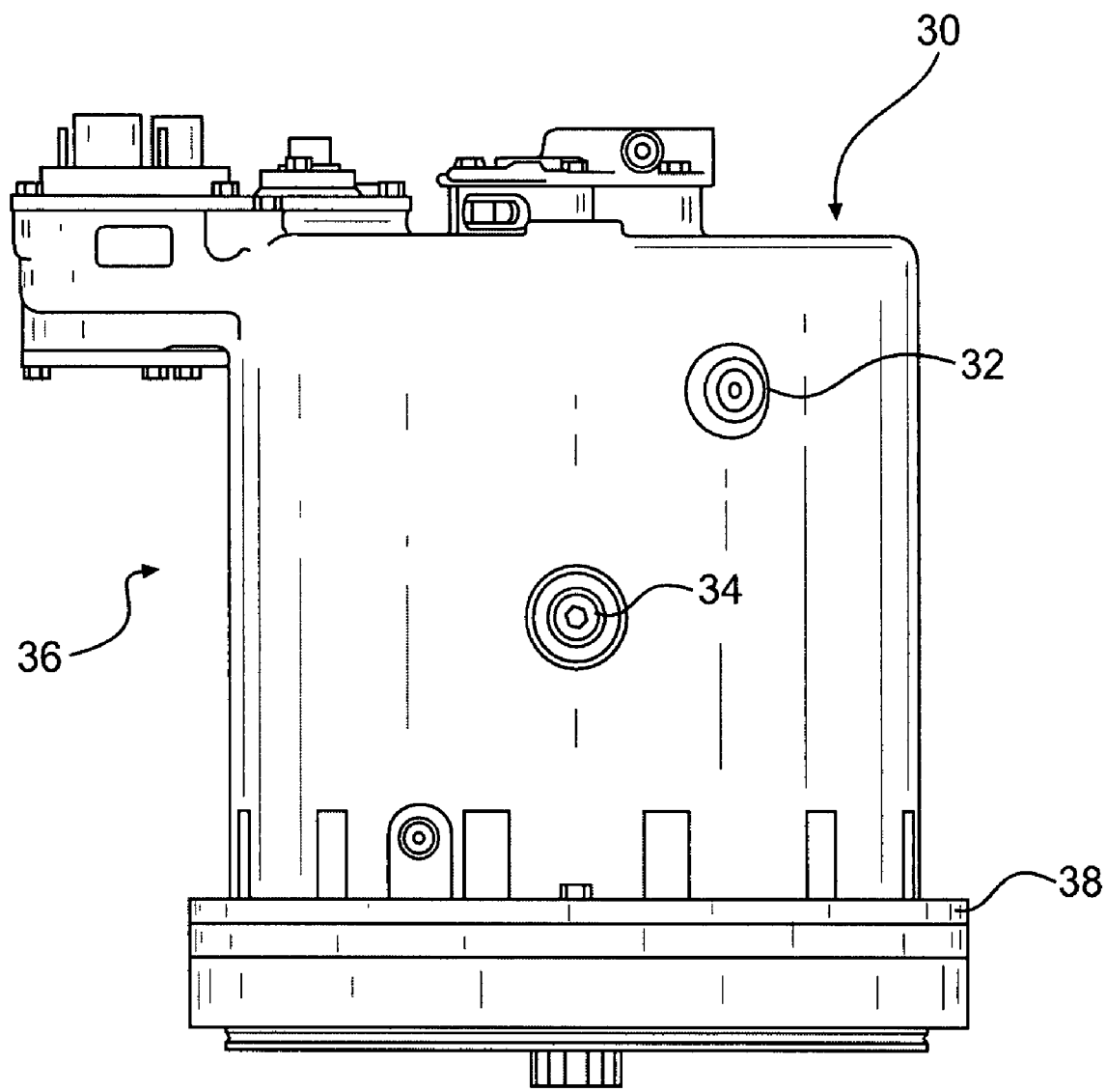
FIG. 3 is an illustrative side view of an exemplary cooling mechanism of the present disclosure.

As shown in FIG. 3, the jacket 20 is sealed with the outer case 30 to prevent the cooling fluid from escaping. The outer case includes a flange 32 on one of its two opposing ends for bolting, an inlet port 32, an outlet port 34, and a port for venting 36. The cooling jacket 20 may slip into the outer case 30 until the last millimeters of travel of the jacket. Next, the jacket 20 may pilot into the outer case 30 for a slight press fit at the opposing ends of the case. The cooling groove area maintains a clearance fit (or slip fit tolerance) relative to the outer case 30, and the pilots are slight presses adjacent to the cooling groove o-rings, as would be understood in the art. Bolts may keep the outer case connected to the cooling jacket 20, and the bolts may provide for annular alignment and allow one way bolting. Optionally, a cooling jacket 10 may be cast into the outer case that the electric motor or generator stator presses into. The outer case may be comprised of a material with a relatively high thermal conductivity such as a metal. Advantageously, a metal outer case allows for effective heat transference.

In use, coolant flows through the one or more inlet ports 32 of the outer case 30 and is directed along the path previously described before exiting the jacket through the outlet port 34. Optionally, in one embodiment, there may be two inlets 32 located at the opposing ends of the outer case 30. One of the inlet ports 32 may be located at the flange 38 end of the outer case, and the other may be a the non-flange end. The cooling fluid may simultaneously flow from one of the inlet ports 32 in a first radial direction and from the other inlet port 32 in a second radial direction to the center of the cooling groove area 50 and exit out of the outlet port 34. The outlet port may be located between two of the inlet ports 32.

The vent for purging air may be located in the middle of the cooling grooves area 50, 180 degrees away from the outlet port 34. As the coolant flows along these paths, it contacts the stator housing or cooling jacket 20 and the outer case 30 and removes heat, thereby cooling the stator. The removal of heat is particularity efficient due to the aforementioned jogged cooling passages 52.

Casting the groove as the part is designed fits most cast processes that would already be used to make traditional prior art stator cooling jackets without the cast grooves. Therefore, no exotic tooling need be designed or created to cast the parts disclosed herein, and a larger pool of suppliers that may not have special machines that can turn a large spiral groove may be utilized.

INDUSTRIAL APPLICABILITY

The electric motor/generator cooling mechanism described herein can be used for cooling jackets for the motors and generators of any applicable system requiring a closed cooling environment, and where air cooling is not sufficient. While the present disclosure has been described in conjunction with a specific embodiment of an electric machine, it is understood that many alternatives, modifications and variations will be apparent to those skilled in the art in light of the foregoing description.

For example, the cooling jacket could be modified to have different numbers and arrangement of grooves, fins and walls to provide for different flow paths through the jacket, or could have more of less parallel sections than the number of sections shown. Further, the inlet and outlet points could be varied to vary the number of flow paths. The particular arrangement used for a given application will depend on size, heat transfer requirements, and possible other factors. Accordingly, the disclosure is intended to embrace all such alternative, modifications and variations, which fall within the spirit and scope of the appended claims.

What is claimed is:

1. An electric motor/generator cooling mechanism comprising:
   a hollow cooling jacket having an inner and outer coaxial surface;
   said inner surface defining a generally cylindric cavity for receiving a stator in heat transference contact with said inner surface;
   said outer surface having a cast spiral groove section with jogged cooling passages;
   an outer case having one or more inlet ports, an outlet port, and a vent for purging air;
   cooling fluid encased between said cooling jacket and said outer case, flowing through said jogged cooling passages; and,
   a flanged end surface on an end of said outer case for boltingly connecting said cooling jacket to said outer case.

2. The cooling mechanism of claim 1, wherein said outlet port is centrally located along the longitudinal axis of said outer case.

3. The cooling mechanism of claim 1, wherein said one or more inlet ports are located essentially on opposing ends of said outer case.

4. The cooling mechanism of claim 3, wherein said cooling fluid enters through said one of said inlet ports and flows in a first radial direction toward said outlet port while simultaneously entering through the other of said inlet ports and flows in a second radial direction toward said outlet port.

5. The cooling mechanism of claim 1, wherein said cooling jacket outer surface is machined into a smooth uniform diameter.

* * * * *